J. C. & J. LORENZ.
Stop Valve.
No. 233,525.
Patented Oct. 19, 1880.
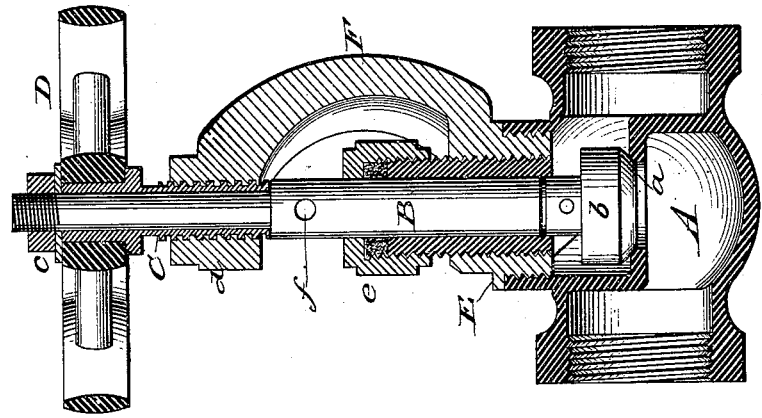
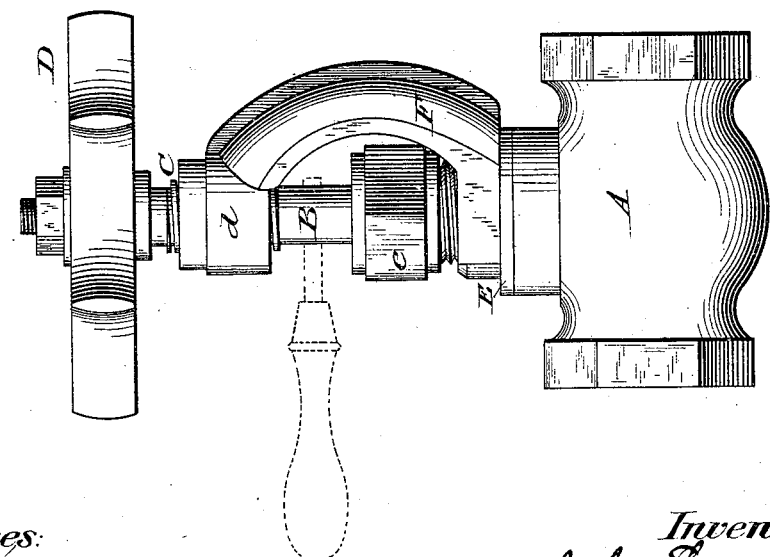

UNITED STATES PATENT OFFICE.

JOHN C. LORENZ AND JOSEPH LORENZ, OF ST. PETERSBURG, PA.

STOP-VALVE.

SPECIFICATION forming part of Letters Patent No. 233,525, dated October 19, 1880.

Application filed February 6, 1880.

*To all whom it may concern:*

Be it known that we, JOHN C. LORENZ and JOSEPH LORENZ, of St. Petersburg, in the county of Clarion and State of Pennsylvania, have invented certain Improvements in Stop-Valves, of which the following is a specification.

Our invention relates to that class of valves in which the valve-disk is rotated and ground upon its seat after being forced thereto; and it is designed as an improvement upon the valve for which Letters Patent were granted to us, bearing date July 15, 1879, and numbered 217,468.

Our invention consists in a peculiar construction embracing the combination of the valve-body, an external threaded sleeve mounted in an arm or support on the body, and a valve stem or spindle mounted loosely in and raised and lowered by means of the sleeve, with a portion exposed outside of the valve, and especially adapted to receive an instrument to give it a positive rotation, in order that it may be ground to its seat without opening the valve.

In the accompanying drawings, Figure 1 represents a side elevation, and Fig. 2 a longitudinal vertical section, of our improved valve.

As commonly constructed, valves which permit of the rotation of the disk or plug upon its seat after being forced thereto are provided with two concentric stems, both of which enter the valve body or case, independent devices being provided for the rotation of either separately, such a construction being employed in the valve for which we obtained a patent, as above stated. This construction is objectionable for several reasons, being expensive and difficult to manufacture, liable to bind and work hard, by reason of unequal expansion and contraction of the two parts of the stem, or in case of either becoming warped or bent, and liable, also, to permit the escape of steam or other vapors or liquid matters, unless special precaution is taken to pack the joint between the stems, which again adds to the expense.

To remedy these objections we construct our valve as represented in the drawings, in which—

A represents the body or case of the usual form, provided with a valve-seat, $a$, a valve-stem, B, furnished at its lower end with a plug or disk, $b$, and a stuffing-box surrounding the stem, as in ordinary globe-valves. The plug or disk $b$ is secured to the stem in such manner as to turn therewith, the stem being made in one piece, solid from end to end, as shown in Fig. 2. The upper part of the stem B is somewhat reduced in diameter, and upon this reduced portion is placed and free to turn a sleeve or collar, C, threaded on its exterior and provided at its upper end with a hand-wheel, D, either formed or keyed thereon. The upper extremity of the valve-stem B, which extends a short distance above the hand-wheel, is threaded to receive a nut, $c$, which is screwed firmly thereon, a washer being preferably interposed between the hand-wheel and nut, and the stem being by preference shouldered, to prevent the nut from being turned upon the hand-wheel with sufficient force to bind the sleeve and stem immovably together.

The parts being thus constructed and the sleeve being mounted in a suitable support, it will be seen that by turning the hand-wheel in one direction it will cause the valve-stem with its plug to rise from its seat, while by reversing the rotation of the wheel the stem and plug will be caused to descend.

It will also be observed that but a single stem enters the valve-case, and that this stem and its plug are free to be turned whether the valve be opened or closed, though they do not necessarily turn in performing either of said operations.

Lastly, it will be noticed that the sleeve is located wholly outside of the valve-case, where it is not subject to the action of the fluid passing through the valve, and cannot become gummed or cut out in its threads by matters contained in the fluid.

In order to support the threaded sleeve thus outside of the case, we provide an overhanging arm, preferably formed upon the valve body, cap, or cover, as shown in Figs. 1 and 2, E representing the cap, and F the overhanging arm. The arm F starts from a point outside of the line of the valve-stem, and rises in a curved form to a suitable height, when it terminates in a nut, d, directly over the center of the valve-seat, the head or nut d being provided with an internal thread to receive the sleeve C, as shown. The curvature of the arm F affords space for the cap e of the packing-gland or stuffing-box, and also permits the rod or handle by which the valve-stem is rotated to have an uninterrupted swing through a large portion of a circle, the stem B being provided with a hole, f, or its equivalent, to receive a rod or other tool, as shown, the lever or rod being represented in dotted lines.

It will be noticed that the opening f is located between the nut or head d and the cap e, where the lever may be applied and left permanently, if desired, without being at all in the way of the hand-wheel. The plug or disk, being forced to its seat by the collar C through the turning of the hand-wheel D, is ground accurately and closely to its seat by turning the stem B by means of the rod or lever.

It is apparent that the arm F may be formed upon the valve-case, if preferred, and that instead of a hole the stem B may have a square or polygonal portion to receive a wrench or other tool.

The valve thus constructed is simple, cheap, and strong, efficient in operation, and handsome in appearance.

We do not claim the overhanging arm F, as we are aware that a like arm has been hitherto used; nor do we claim the outside independent sleeve to operate the spindle, except when the parts are constructed and arranged to permit and facilitate the positive rotation of the spindle in order to grind the same tightly to the seat.

We are also aware that a valve-stem has been loosely journaled in a screw-collar, by which it was raised and lowered; but the parts were so constructed that a tool could not be applied to grind the stem to its seat.

What we claim is—

In a stop-valve, the combination of the body having the arm thereon, the threaded sleeve located in the arm outside of the body, and the valve-spindle journaled loosely in the sleeve with an exposed portion specially adapted, substantially as described and shown, to receive means for imparting a positive rotation thereto, whereby the valve may be ground to its seat without opening the valve, and without requiring the use of more than one joint opening into the valve.

JOHN C. LORENZ.
JOSEPH LORENZ.

Witnesses:
JAMES HASLETT,
ROBERT HASLETT.